United States Patent [19]

Traina

[11] Patent Number: 5,249,678
[45] Date of Patent: Oct. 5, 1993

[54] REUSABLE PACKAGING SYSTEM FOR HOUSEHOLD APPLIANCES

[75] Inventor: Alfredo Traina, Porcia, Italy

[73] Assignee: Zanussi Elettrodomestici S.P.A., Italy

[21] Appl. No.: 888,986

[22] Filed: May 26, 1992

[30] Foreign Application Priority Data

Jun. 13, 1991 [IT] Italy .................... 91 A 000034

[51] Int. Cl.⁵ .................................. B65D 85/00
[52] U.S. Cl. ........................ 206/320; 206/521; 220/6; 220/1.5
[58] Field of Search ............ 220/1.5, 6, 8, 4.28, 220/4.33, 4.34, 420, 469; 206/320, 326, 521, 523, 583, 586, 592

[56] References Cited

U.S. PATENT DOCUMENTS

| | | | |
|---|---|---|---|
| 3,327,882 | 6/1967 | Andrews | 220/469 X |
| 3,416,648 | 12/1968 | Levi | 206/523 X |
| 3,487,921 | 1/1970 | Barth et al. | 206/583 |
| 3,527,339 | 9/1970 | Cipolla | 220/6 X |
| 3,527,340 | 9/1970 | Cipolla | 220/6 X |
| 3,765,556 | 10/1973 | Baer | 220/1.5 |
| 4,120,417 | 10/1978 | Aquino | 220/6 |
| 4,234,092 | 11/1980 | Axel | 206/523 |
| 4,287,990 | 9/1981 | Kunck | 206/523 X |
| 4,386,702 | 6/1983 | Schultz et al. | 206/523 |
| 4,577,772 | 3/1986 | Bigliardi | 220/1.5 |
| 4,630,746 | 12/1986 | Fortenberry | 220/6 |
| 4,884,686 | 12/1989 | Dupuis | 206/320 |

Primary Examiner—Bryon P. Gehman
Attorney, Agent, or Firm—Pearne, Gordon, McCoy & Granger

[57] ABSTRACT

Reusable packaging system having two specular side members (2) of rigid plastic material adapted to be applicable to the sides of a household appliance (1). Each one of said side members includes at its ends two corner pieces (6) having an upper protrusion (7) and a lower protrusion (8) interconnected by a flange (9). Two pairs of lower cross members (16, 17) and two pairs of similar upper cross members (18, 19) are adapted to form a lower frame and an upper frame interposed between the appliance, the flanges (9) and the protrusions (7, 8) of said corner pieces (6). A pair of cross members (16, 18) of each frame has a length which is equal to the length of the side members (2), whereas the other pair of cross members (17, 19) of each frame has a length which is shorter than that, but at least equal to the distance between the corner pieces (6) of each side member. The side members (2) are foldable in an accordion-like way, in correspondence of longitudinal grooves (11), from an extended condition in which they are applicable to the sides of the appliance (1), to a retracted condition in which they can be joined specularly together so as to be able to accommodate the cross members and to be stored conveniently.

8 Claims, 4 Drawing Sheets

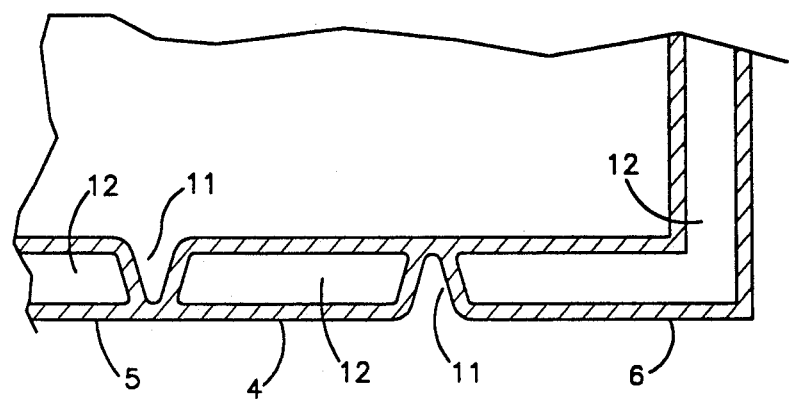
Fig.5
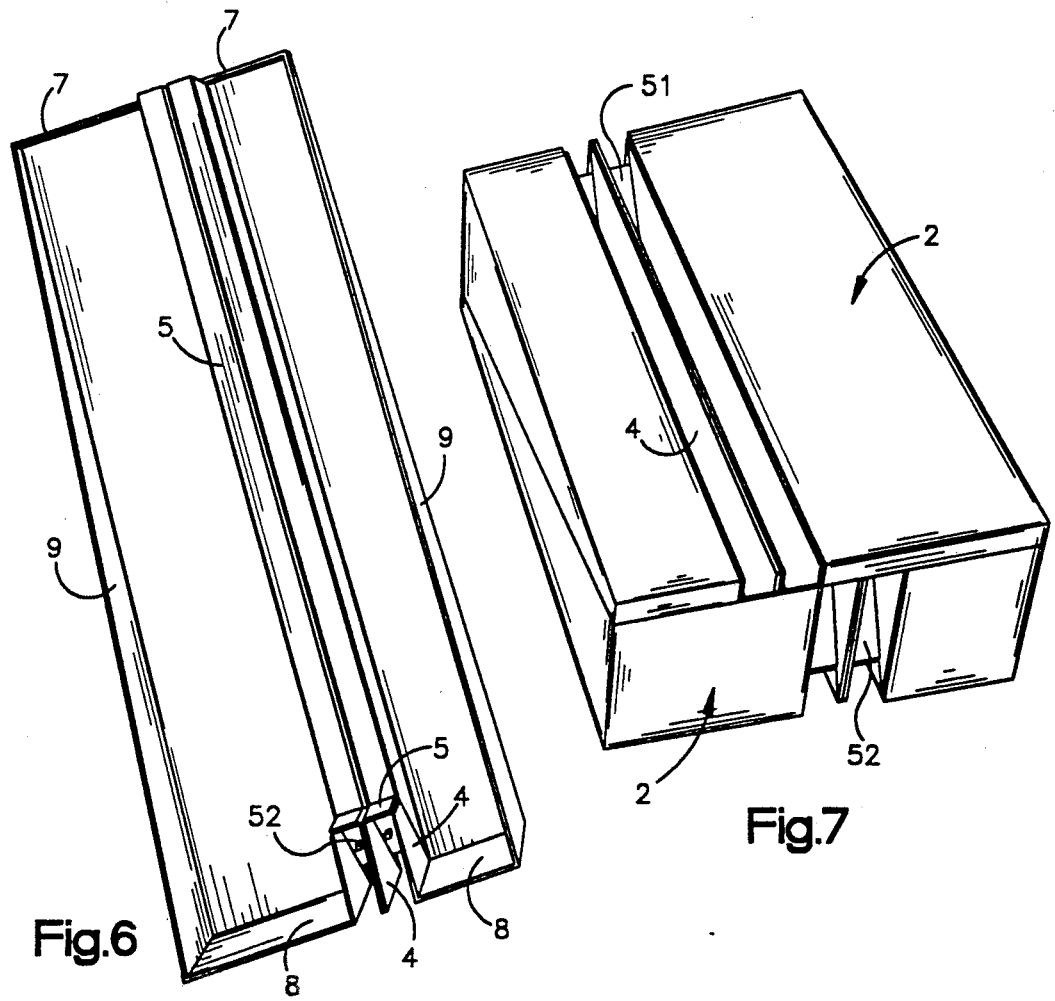
Fig.6
Fig.7

REUSABLE PACKAGING SYSTEM FOR HOUSEHOLD APPLIANCES

DESCRIPTION

The present invention relates to a simple, robust and reusable packaging system, in particular for household and similar appliances being substantially parallelepipedonal in their shape.

It is well known that, for packaging household appliances such as washing machines, cookers and the like, cardboard boxes are normally used, which are appropriately strengthened in correspondence of their parts that are most likely subject to shocks, in view of effectively protecting the appliance against transportation damages. In particular, corner pieces of foamed plastic material are introduced in said cardboard box so as to locate them in correspondence of the vertical edges of the appliance, whereas protection plates, normally made of cardboard and/or foamed plastic material, are placed at the base and the top of the same appliance, respectively. The packaging resulting therefrom is then completed with tightening straps or the like, which keep the various parts of the packaging together.

This type of packaging, although widely in use, has a number of drawbacks:
a) it is easily damaged and spoiled and, therefore, hardly reusable, so that a lot of material is normally wasted;
b) it gives rise to distinct problems in connection with the disposal of the resulting waste materials and the related pollution effects;
c) it gives rise to distinct problems in connection with the huge space requirements for storing the related packaging materials for further use down the assembly lines;
d) it requires component parts having different dimensions to be manufactured and kept in store in view of coping with packaging requirements brought about by appliances manufactured to different standard sizes.

Various types of reusable packaging systems have been suggested, such as the ones based on the use of plastic component parts that are adapted to be snap-fitted together around an appliance. However, such systems are actually capable of only overcoming a part of the above cited drawbacks and, in particular, they fail to be effective in solving the problems described under c) and d) above.

It is the purpose of the present invention to provide a simple and robust type of reusable packaging system, in particular for household appliances of the afore mentioned type, which is really capable of solving all typical problems brought about by prior-art systems.

According to the present invention, such an aim is reached in a reusable packaging system, in particular for household appliances, embodying the features of the appended claims.

The invention will be further described by way of nonlimiting example, so that its features and advantages will become more apparent, with reference to the accompanying drawings in which:

FIGS. 4 and 5 are a view showing a partial section of the component part shown in FIG. 3, as taken along a transverse plane IV—IV, according to respective embodiments;

FIG. 6 is a magnified perspective view of the component part shown in FIG. 3, in a retracted position;

FIG. 7 is a perspective view of the packaging system shown in FIGS. 1 and 2, as prepared for storing.

Figure 1:
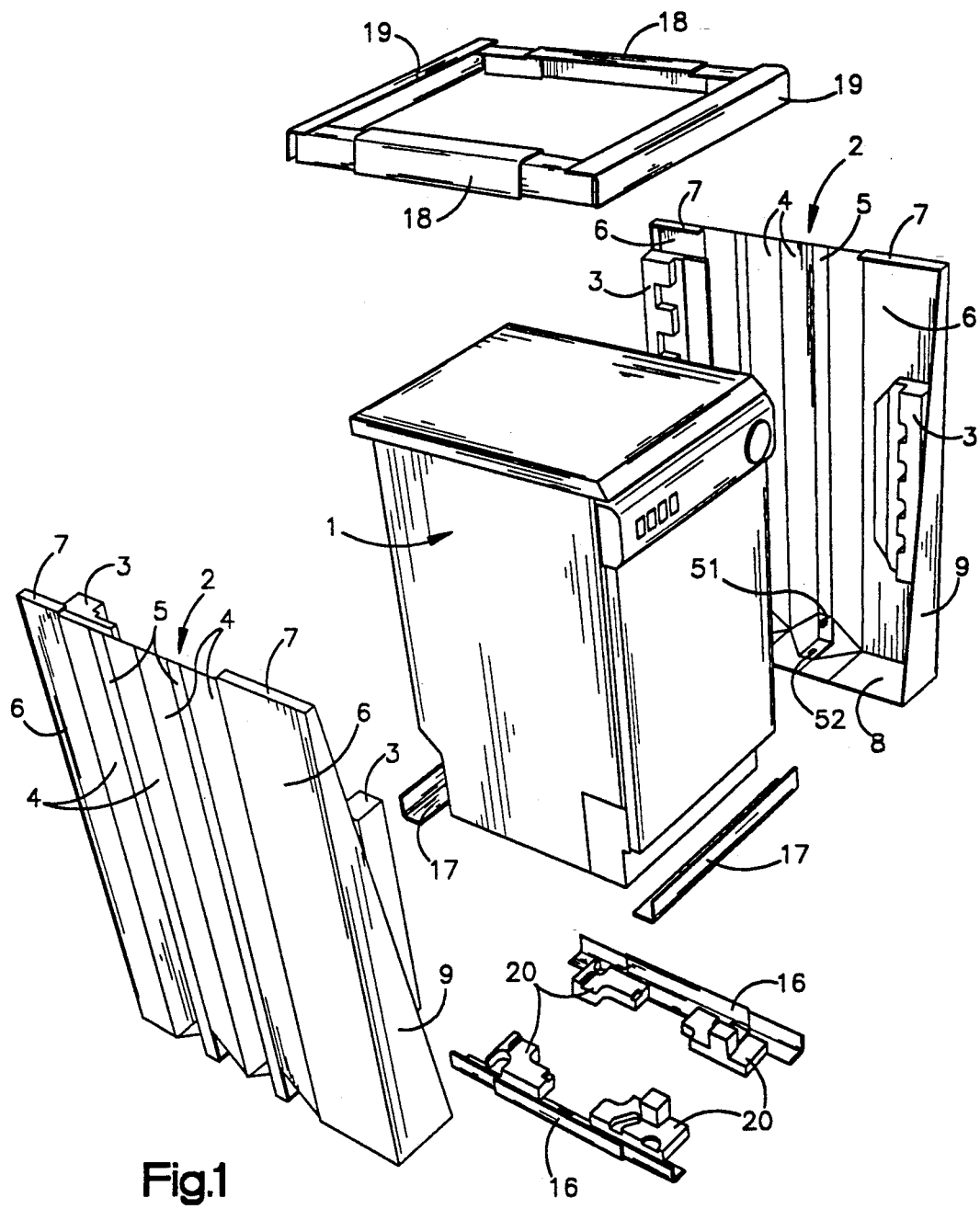
FIG. 1 is an exploded view of the main component parts forming the packaging system according to the invention, as used in connection with household appliances having a standard size.
Figure 3:
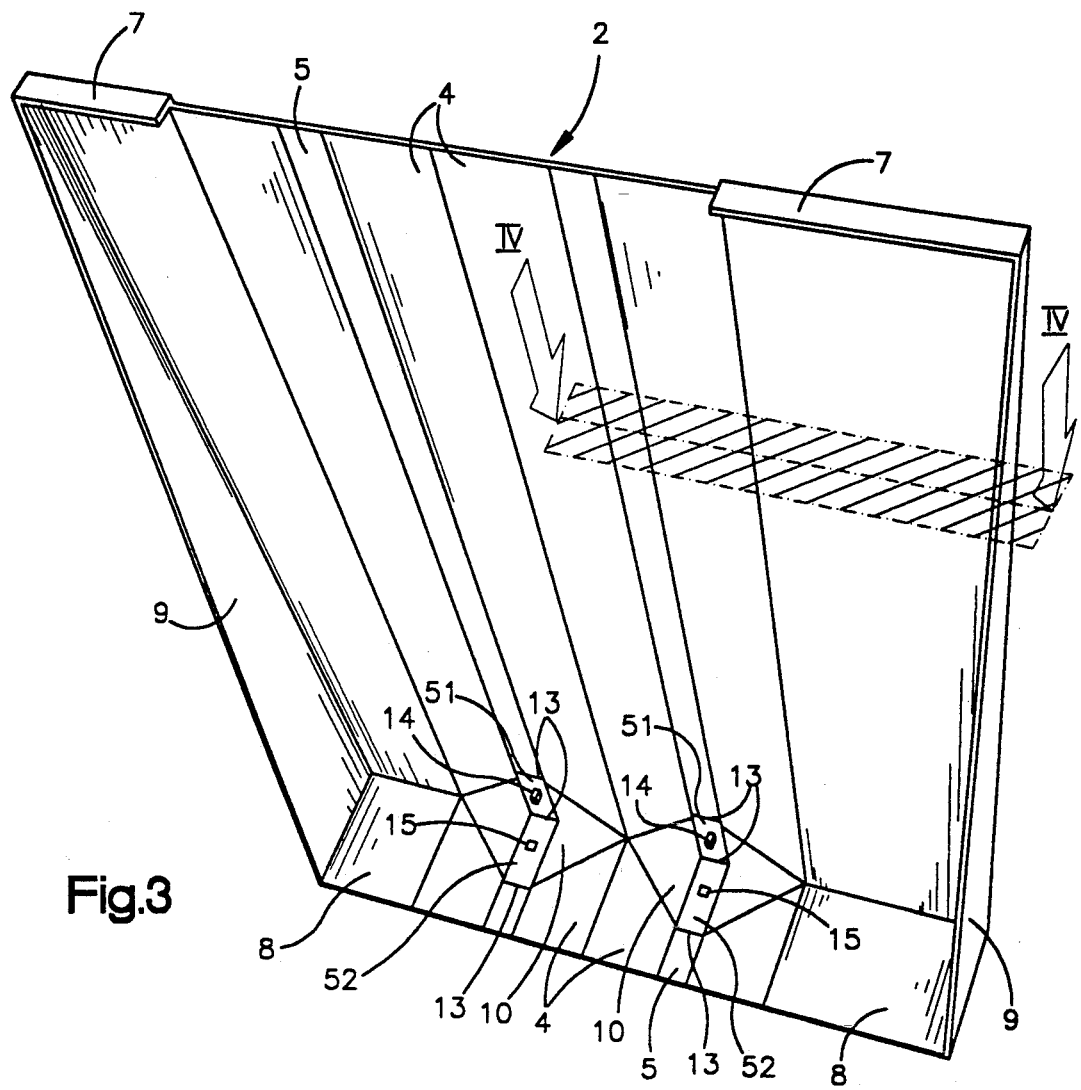
FIG. 3 is a perspective view from the top of a component part of the packaging system according to the invention, in a fully extended position.

Referring in particular to the FIGS. 1 and 3, it can be seen that the packaging system according to the present invention appears to be applied, by way of example, to a household appliance 1 being substantially parallelepipedal in its shape, with a rectangular base. For instance, said household appliance 1 may be considered as being a dishwashing machine having standard depth and width sizes of 60 cm and 45 cm, respectively.

The packaging system essentially comprises a pair of side members 2, which are preferably of a specular design and applicable to the respective sides of said household appliance 1 under interposition of appropriately shaped profiles 3 for protecting the vertical edges of the appliance.

Said profiles 3, which are fastened and kept in position by for instance snap-fitting means of a per se known type (and not shown in the figures), are in a preferred way made of foamed polypropylene or similar material.

Each of said side members 2 is essentially formed, with a L-shaped longitudinal section, by two corner pieces 6 constituting the respective end portions of the same side member, said corner pieces being interconnected by a plurality of substantially plane intermediate elements 4, 5 that are located therebetween in a side-by-side arrangement and are preferably different in their width size.

In particular, the narrower intermediate elements 5 are arranged in an alternate sequence between the wider intermediate elements 4, as illustrated in the afore cited figures. In correspondence of the corner of said L-shaped section, said wider intermediate elements 4 are provided with apertures 10, through which respective portions 51, 52 of said narrower intermediate elements 5 extend longitudinally. At their respective ends, said portions 51, 52 are provided with grooves 13 that are adapted to allow them to be folded in a hinge-like way.

The corner pieces 6 are shaped with an inward protrusion 7 along the upper edge, as well as an inward protrusion 8, having preferably a greater length, along the lower edge. Furthermore, the outward edge of said corner pieces 6 has a configuration with a transverse flange 9 (front and rear flange, respectively) interconnecting said protrusions 7, 8.

On each side member 2, the lower protrusions 8 of said pair of corner pieces 6 are interconnected with each other, so as to form a substantially continuous base surface, by means of corresponding lower portions of said intermediate elements 4, 5 (illustrated as extending horizontally in the FIGS. 1 and 3).

Figure 4:
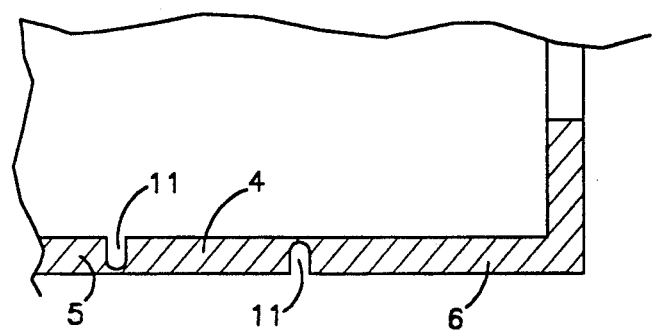

According to a feature of the present invention, each side member 2 is provided as a single-piece moulding of rigid plastic material, such as for instance injection-moulded polypropylene, as shown in the partial section of FIG. 4. Alternatively, said side members 2 can be advantageously provided as mouldings of blow-moulded polypropylene, as shown in the partial section in FIG. 5, whereas each one of said corner pieces 6 and said intermediate elements 4, 5 is in this case given an inner hollow cavity 12 which is adapted to add structural strength and increase overall resilience.

At any rate, each side member 2 is preferably moulded with a plurality of longitudinal grooves 11 (FIGS. 4 and 5) delimiting said intermediate elements 4, 5 and giving the same side member a substantially "bellows-like" configuration. In particular, said longitudinal grooves 11 (which are similar to the grooves 13) are in a preferred way arranged in an alternate sequence on the outer surface and the inner surface of each side member 2, which can in such a way be easily folded in a hinge-like way (owing also to the elasticity of the material used) in correspondence of the same grooves. In other words, each side member 2 is therefore foldable in an accordion-like way as, as a consequence, compactable from a fully extended condition as shown in FIG. 3 to a fully retracted condition as shown in FIG. 6, in which it does therefore not take up much storage space.

As it is apparent when comparing the conditions shown in FIG. 3 and FIG. 6, the folding of each side member 2 is made easier by the provision of said apertures 10 and said portions 51, 52 of the intermediate elements 5. As a matter of fact, by manually pressing on the portions 51, 52 from the outside so as to cause their respective inner surfaces to fit together, the folding of the various elements of the side member 2 along the respective grooves 11, 13 is automatically brought about. As a consequence, the side member 2 will easily be folded into its lowest-encumbrance retracted condition as shown in FIG. 6, whereas it may also be kept in this retracted condition by means of elastic teeth 14 snap-fitting into corresponding holes 15, which are integrally moulded on the portions 51 and 52, respectively. At this point, therefore, the pair of specularly designed side members 2 can be interconnected along their respective edges, as shown in FIG. 7, so as to form a small-size, low-encumbrance box-like container, in which all other parts used as accessory items to complete the packaging can be also housed for storage and/or transportation. Said two side members 2 can of course be fixed and held together in the box-like configuration shown in FIG. 7 either by means of straps, bands and the like or by the use of snap-fitting fastening means of a per se known type (not shown in the figure) integrally moulded on the same side members.

Said accessory parts used to complete the packaging according to the present invention comprise mainly two pairs of cross members 16, 17, which may for instance be formed by mouldings of a rigid plastic material such as injection-moulded polypropylene.

Said cross members 16, 17 preferably have an L-shaped cross-section and are adapted to be arranged at the base of the household appliance 1, in association with appropriately shaped protection pieces 20, so as to form a kind of surbase, i.e. a support frame all along the perimeter of the base.

In particular, said pairs of cross members 16, 17 substantially have length sizes that are respectively equal to the depth and the width of a household appliance 1 having a rectangular base and standard overall dimensions.

The packaging system according to the invention comprises two further pairs of cross members 18, 19 that are similar to the afore cited cross members 16, 17 and adapted to form a similar perimetric frame for the top of the household appliance 1. In the particular case illustrated in FIG. 1, in which the household appliance has a rectangular base, it can be noticed that the longer cross members 16, 18 and the shorter cross members 17, 19 are arranged along the longer and the shorter sides of the appliance, respectively.

The two specular side members 2 of the packaging system are installed on respective sides of the household appliance 1 so as to also enclose said two base and top frames formed by the cross members 16, 17 and 18, 19, respectively, which are in turn held together in position by the protrusions 7, 8 and the flanges 9 of the corner pieces 6. Furthermore, at least the frame formed by the pair of lower cross members 16, 17 is capable of getting clasped laterally between the base and the elastic teeth 14 of each side member 2.

Figure 2:
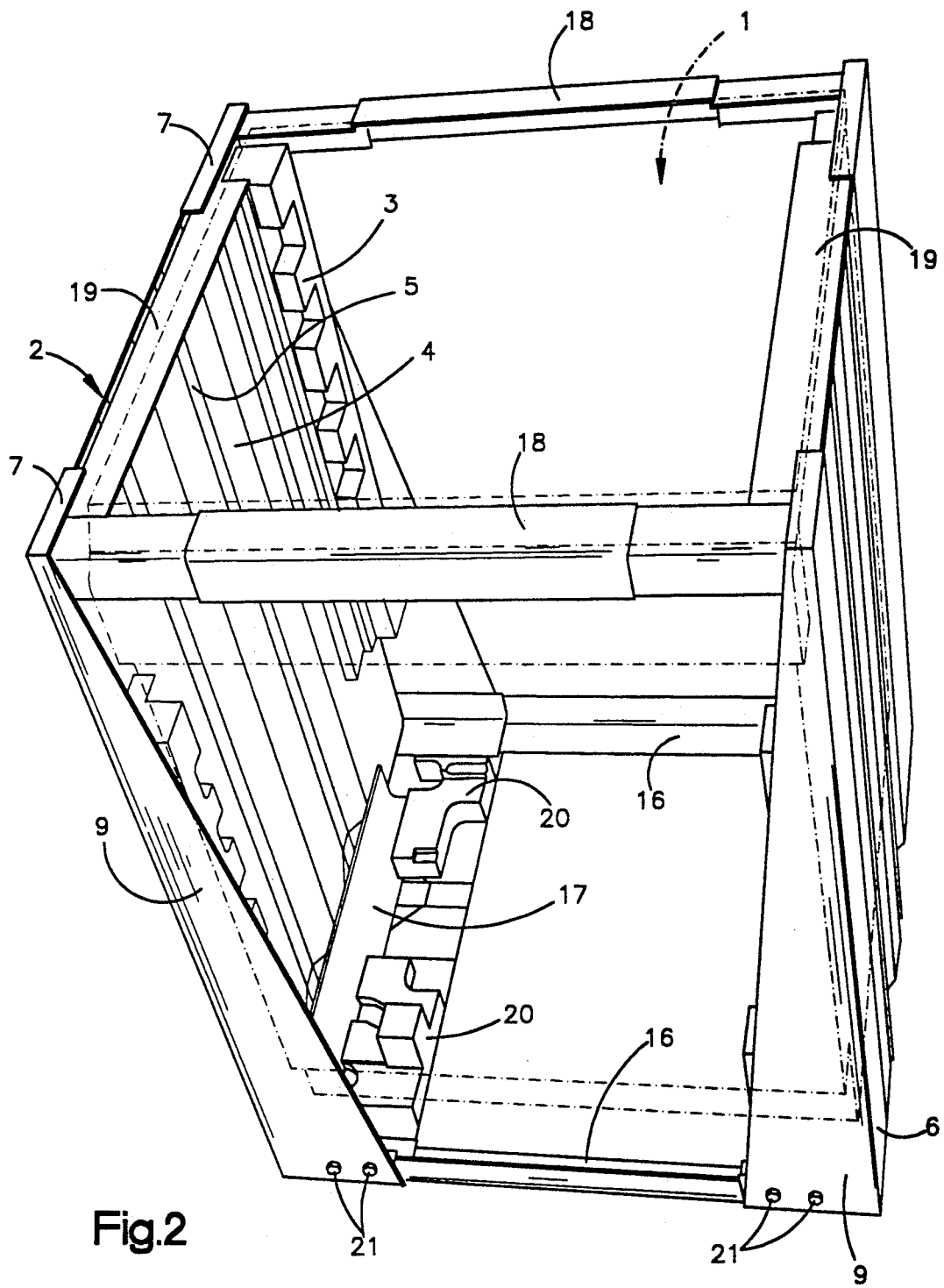
FIG. 2 is a perspective view from the top of the packaging system according to the invention, as used in connection with household appliances having different standard sizes.

After having been assembled in the afore described way, the whole packaging can be held together by the use of such per se known means as straps or the like, or the cross members can be otherwise fastened to the side members 2 by means for instance of screws 21, as this is shown in FIG. 2, or other appropriate snap-fitting fastening means provided on the same component parts in a per se known way (and not shown in the figure).

In the case that the household appliance 1 has a square-shaped base, as shown in FIG. 2, reversing the arrangement of the pairs of cross members 16, 17 and 18, 19 is all that is required to adapt the packaging. In particular, the longer cross members 16 and 18 are arranged along the front and rear sides of the household appliance, whereas the shorter cross members 17 and 19 are arranged at both sides of the appliance, where they get engaged with the protrusions 8 and 7, respectively, of the corner pieces 6. It will be appreciated that the length of the shorter cross members 17, 19 will be at least equal to the distance between the corner pieces 6 of each side member 2 under extended condition, whereas the length of the longer cross members 16, 18 will substantially correspond to the length of each side member 2 under extended condition.

The particular flexibility in the practical use of the packaging system according to the invention can also be clearly inferred from the afore described considerations, said packaging system not requiring actually any constructional modification so as to be capable of being indifferently applied to either square-based or rectangular-based household appliances having standard dimensions.

It will be appreciated that the above described packaging system may be the subject of any modifications considered to be appropriate, without departing from the scopes of the invention.

It is at any rate fully apparent that the strength and the rigidity of the packaging system according to the present invention are such as to allow the packaging to be repeatedly used and safely handled, as well as to be conveniently stored between subsequent uses, owing to its compact overall dimensions.

I claim:

1. A reusable packaging system for an object being substantially parallelepipedal in shape, characterized in that the packaging system comprises a pair of single-piece side members (2) having a given width, and made of rigid plastic material and adapted to be applied on respective sides of an object (1), each one of said side members comprising at respective end portions thereof spaced apart corner pieces (6); and an upper inward protrusion (7) and a lower inward protrusion (8) interconnected through a transverse flange (9) provided on each corner piece, said packaging system further comprising two pairs of lower cross members (16, 17) arranged to form a lower frame interposable between a base of an associated object, the flange (9) of each of the corner pieces, and the lower protrusion (8) of each of the corner pieces (6) of both side members; and two pairs of upper cross members (18, 19) arranged to form an upper frame interposable between a top of an associated object, the flange (9) of each of the corner pieces, and the upper protrusion (7) of each of the corner pieces (6) of both side members; a pair of the lower cross members (16) forming said lower frame and a pair of the upper cross members (18) forming said upper frame substantially spanning the width of said side members (2), and the other pairs of cross members (17, 19) forming each one of said frames spanning the space between said corner pieces (6) of each side member (2) and not spanning the width of said side members.

2. A reusable packaging system for an object according to claim 1, characterized in that each one of said side members (2) is configured with a plurality of longitudinal grooves (11) arranged between said corner pieces (6) in an alternate sequence on the inner surface and the outer surface of the side member so as to allow said side member to be folded in a bellows-like manner, in correspondence of said longitudinal grooves (11), from an extended condition in which it can be applied on to the sides of an associated object (1) to a retracted condition for convenient storage.

3. A reusable packaging system according to claim 2, characterized in that said side members (2) are adapted to specularly join together in said retracted condition along respective edges thereof so as to form a container adapted to accommodate said cross members (16–19).

4. A reusable packaging system according to claim 2, characterized in that each side member (2) has a substantially L-shaped longitudinal section, said grooves (11) of each side member delimiting a plurality of substantially planar intermediate elements (4, 5) disposed in a side-by-side arrangement between said corner pieces (6), in which apertures (10) are provided in correspondence of the corner of said L-shaped section, said apertures (10) being adapted to allow each side member (2) to be folded in said bellows-like manner.

5. A reusable packaging system according to claim 4, characterized in that some elements (5) among said intermediate elements (4, 5) extend longitudinally through said apertures (10) with respective hinged portions (51, 52) which are adapted to be folded onto each other so as to enable each one of said side members (2) to be folded in said bellows-like manner.

6. A reusable packaging system according to claim 5, characterized in that said hinged portions (51, 52) comprise an inner surface which is provided with respective snap-fitting fastening means (14, 15) adapted to keep each one of said specular side members (2) in said retracted condition.

7. A reusable packaging system according to claim 1 or 2, characterized in that said side members (2) are made of blow-moulded polypropylene with a plurality of inner hollow cavities (12).

8. A reusable packaging system according to claim 1 or 2, characterized in that said side members (2) are made of injection-moulded polypropylene.

* * * * *